United States Patent
May et al.

(10) Patent No.: US 7,231,223 B2
(45) Date of Patent: Jun. 12, 2007

(54) PUSH-TO-TALK CALL SETUP FOR A MOBILE PACKET DATA DISPATCH NETWORK

(75) Inventors: Nigel M. May, Phoenix, AZ (US); Mark A. Marick, Chandler, AZ (US); Bradley R. Schaefer, Chandler, AZ (US); Mark L. Shaughnessy, Phoenix, AZ (US); William J. Sugden, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 576 days.

(21) Appl. No.: 10/323,428

(22) Filed: Dec. 18, 2002

(65) Prior Publication Data

US 2004/0121791 A1 Jun. 24, 2004

(51) Int. Cl.
*H04Q 7/20* (2006.01)
*H04B 7/00* (2006.01)
*H04B 7/216* (2006.01)

(52) U.S. Cl. ............... 455/519; 455/517; 455/518; 370/342; 370/441

(58) Field of Classification Search ........... 455/518, 455/519, 415, 503, 517; 370/342, 441
See application file for complete search history.

(56) References Cited

U.S. PATENT DOCUMENTS

| | | | |
|---|---|---|---|
| 6,397,061 B1 | 5/2002 | Jordan et al. | |
| 6,477,150 B1* | 11/2002 | Maggenti et al. | 370/312 |
| 6,714,795 B1* | 3/2004 | Long et al. | 455/518 |
| 6,725,053 B2* | 4/2004 | Rosen et al. | 455/518 |
| 6,882,856 B1* | 4/2005 | Alterman et al. | 455/519 |
| 6,898,436 B2* | 5/2005 | Crockett et al. | 455/518 |
| 6,912,401 B2* | 6/2005 | Rosen et al. | 455/518 |
| 6,930,994 B1* | 8/2005 | Stubbs | 370/348 |
| 6,970,926 B1* | 11/2005 | Needham et al. | 709/225 |
| 2001/0029196 A1 | 10/2001 | Wakamatsu | |
| 2002/0025800 A1 | 2/2002 | Forbes et al. | |
| 2002/0072354 A1* | 6/2002 | Kundaje et al. | 455/416 |

FOREIGN PATENT DOCUMENTS

| | | |
|---|---|---|
| GB | 2317073 A | 3/1998 |
| WO | WO 01/67675 A2 | 9/2001 |
| WO | WO 01/67675 A3 | 9/2001 |
| WO | WO 02/093953 A1 | 11/2002 |

* cited by examiner

*Primary Examiner*—Tilahun Gesesse

(57) ABSTRACT

A proactive speculation method decreases the call setup time for private calls (200) and selective dynamic group calls (300). In a push-to-talk dispatch network (40) an originating mobile unit (10) sends a wake-up packet (54, 114) to the dispatch network (40). Prior to initiating the push-to-talk function, the target mobile units (20–30) receive a wake-up packet (68, 146–148) from network (40). Thereby, prior to establishing the push-to-talk function, each of the mobile units in the push-to-talk call have been coupled via RF links. If the originating mobile unit has a current IP address, direct wake-up packets (72) may be sent.

19 Claims, 3 Drawing Sheets

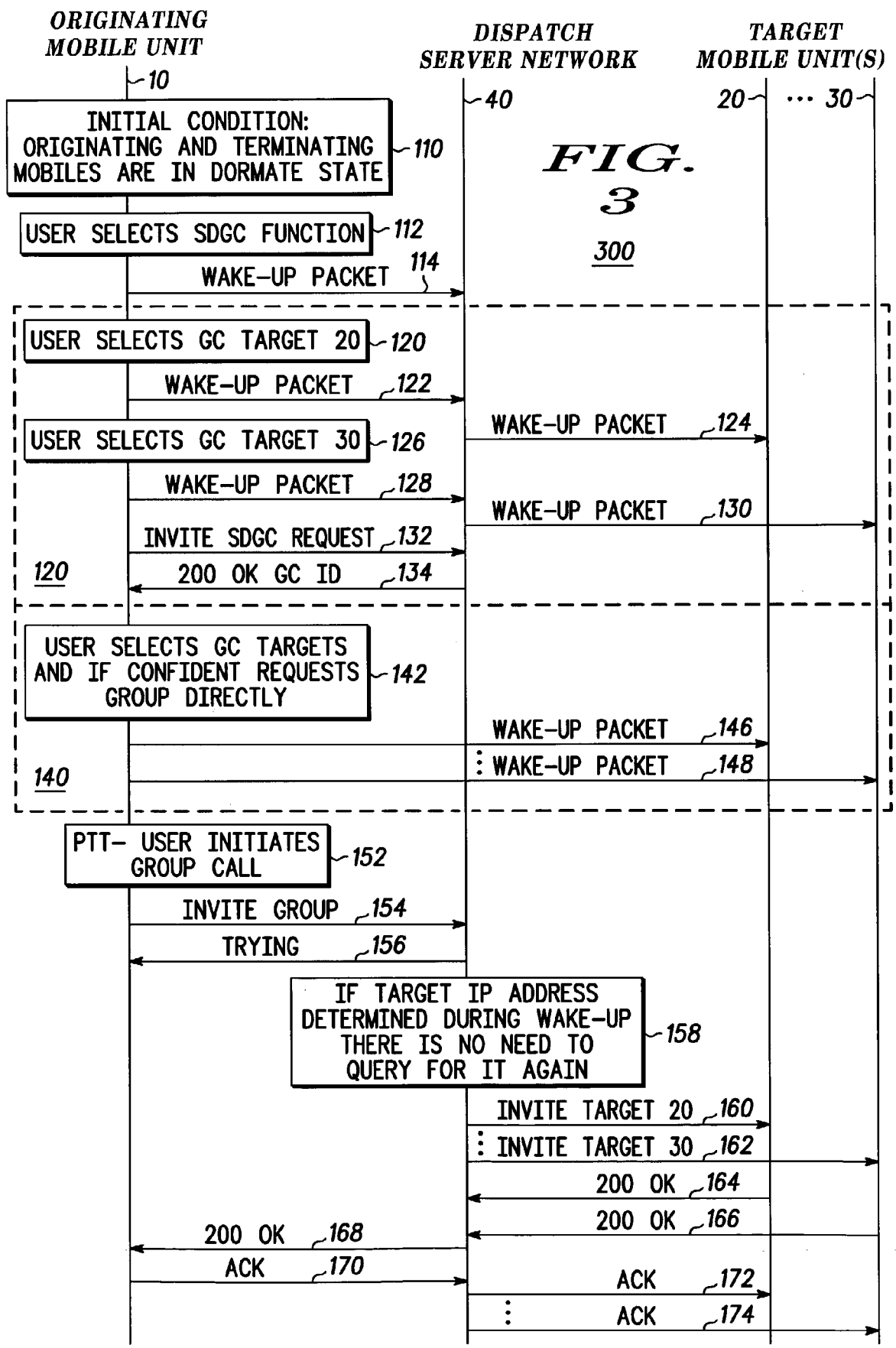

PUSH-TO-TALK CALL SETUP FOR A MOBILE PACKET DATA DISPATCH NETWORK

BACKGROUND OF THE INVENTION

The present invention pertains to mobile packet data networks and more particularly to call setup methodology for push-to-talk mobile calls.

In wireless communication systems mobile units or devices are required to operate on batteries and these mobile units will go inactive on the RF channels (or dormant) after a short period of inactivity of usage for data services, usually 30 to 60 seconds. Therefore, in push-to-talk calls using the wireless data services, both the originating and terminating mobile units must be transitioned to the active state (actually using RF resources) as part of the call setup prior to enabling the push-to-talk function. Once a mobile unit is in the active state, an RF (radio frequency) channel has been established and the mobile unit is able to transmit and/or receive data. As known in the art, push-to-talk call applications include transmission of voice and associated signaling data, but advances in packet data networks extend push-to-talk call applications to include images, streaming video, text messaging, stored audio files, and other multi-media.

For typical push-to-talk call applications, the time required for transitioning an originating mobile unit from a dormant state to the active state can be greater than 3 seconds in current implementations. An equal or greater amount of time is required to transition the terminating mobile unit from the dormant to active state, including additional time to actually page the mobile device, as is known in the art. These times do not include transmission time over the air or call processing time required by the dispatch servers. As a result, for the push-to-talk function total delay times experienced by the originating mobile unit may be 10 seconds or greater.

With long call setup times, the advantages of the push-to-talk service as an instant communications method is diminished. In fact, call setup times of 8 seconds or even longer may make the service non-viable in the marketplace. For example, users would prefer to use cellular, rather than holding down the PTT button.

A similar problem exists for group calls in the push-to-talk mode. Call setup times may be even longer since there are a number of terminating mobile units to connect to the originating mobile unit. Although some of the processing time for each of the terminating or target mobile units may overlap, the total call setup time is even greater than the individual-to-individual call. Therefore, group calls pose an even greater problem for the push-to-talk function in a packet data network.

Accordingly, it would be highly desirable to have a method for substantially decreasing the call setup time for private calls and group calls within a push-to-talk packet data network configuration.

BRIEF DESCRIPTION OF THE DRAWING

FIG. 3 is a flow diagram of a group call method in accordance with the present invention.

DESCRIPTION OF THE PREFERRED EMBODIMENT OF THE INVENTION

The techniques to improve the setup time fall into two categories, those that improve the time for the originating mobile device to be activated on the RF network, and those that provide the time for the target user mobile device to be activated on the RF network.

The key to making push-to-talk applications in a 3G environment successful is a fast call setup time. If the time required to transition a mobile unit from dormant to active state cannot be reduced, it may be able to be minimized and hidden from the user. The mobile unit may take prospective action (speculation) based upon actions of the originating mobile user. These actions may include selection of the phone book directory of the mobile unit, selecting a target caller to call or creating a group for a group call, or other actions on the mobile device such as selecting the dispatch function in a menu, opening the cover of the phone, or even removal of the mobile device from it's holster.

In a packet data communication system, a wake-up packet may be used to trigger a transition of a mobile unit from dormant to active states. The wake-up packet may be very small and need not contain any information. The main use of the wake-up packet is to insure that an RF link is established between the mobile unit and the packet data network.

For a mobile call origination, a mobile user may open his phone book located on the handset and select the target (or targets for a group call) and presses the push-to-talk button. When the push-to-talk button is pressed, a signaling message (invite) message is sent from the originating mobile unit to the push-to-talk dispatch server, to start the process of inviting the target mobile to join a dispatch call. The act of attempting transmission of this invite message changes the state of the originating mobile unit from dormant to active on the RF resource. The act of needing to send a session initiation protocol message causes the mobile (and infrastructure) to move from the dormant to an active state on the RF resource. By means of the operating software of the originating mobile unit taking prospective action, dormant to active state transition for each of the mobile units involved in the push-to-talk call may be accomplished more rapidly (or in advance of the signaling) than conventional methods.

Figure 1:
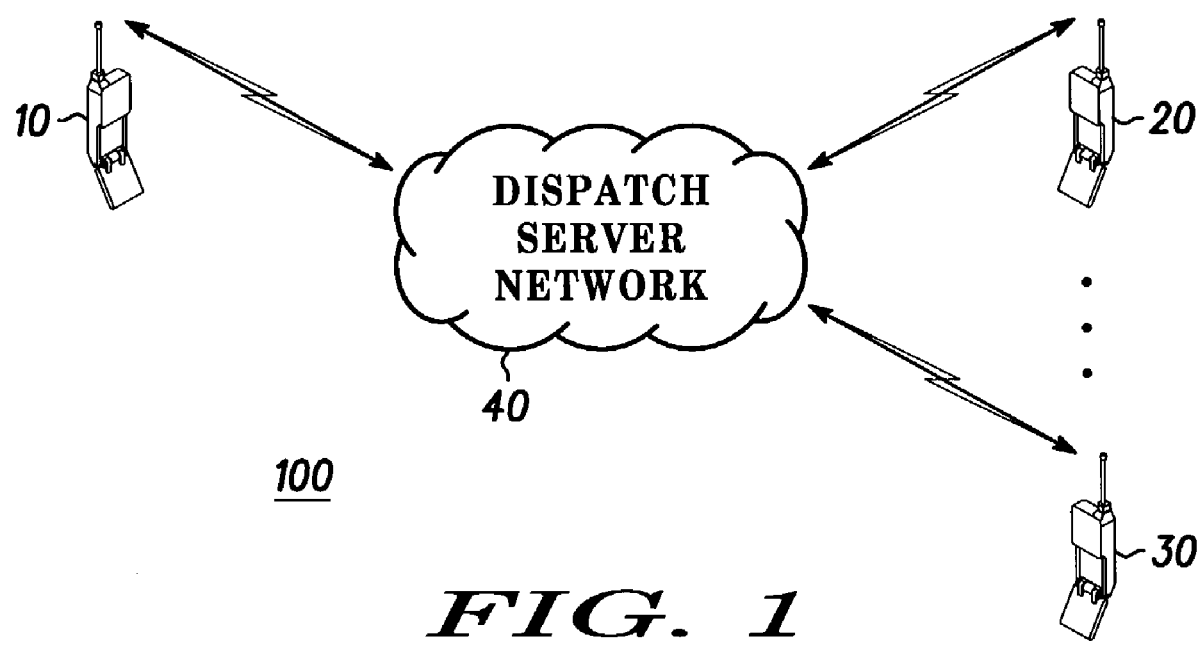
FIG. 1 is a block diagram of a packet data network dispatch server for supporting private and group calls in accordance with the present invention.

Referring to FIG. 1, a block diagram of a push-to-talk dispatch server network 40 is shown. Network 40 may be coupled to originating mobile unit 10 and terminating mobile units 20 and 30. To conserve batteries and system resources, each of the mobile units 10–30 would typically be in a dormant state. That is, no active RF data link would couple the mobile unit to the network 40.

For a push-to-talk one-to-one call, originating mobile unit 10 may be calling either mobile unit 20 or mobile unit 30. For a push-to-talk group call (one-to-many), mobile unit 10 will establish a call with multiple parties, such as both mobile units 20 and 30. For a push-to-talk group call, when the originating mobile unit 10 performs an action such a entering the unit's address book, a wake-up packet is sent to the dispatch server network, causing the originator to move from a dormant state to an active state on the RF network. Then when the user of mobile unit 10 selects a terminating mobile unit 20, for example, whether by means of selection of the phone book or verbally for a voice recognition arrangement, a wake-up packet is sent from the originating mobile unit 10 through PTT dispatch server network 40 to the terminating mobile unit 20 to transition the target mobile unit 20 to the active state. If the originating mobile unit 10 has a recent internet protocol (IP) address for the target mobile unit 20, the originating mobile unit 10 sends a wake-up packet directly to the terminating or target mobile unit 20. Otherwise the originating mobile unit 10 sends a wake-up packet to the push-to-talk dispatch server 40 to be forwarded through to the target mobile unit 20.

Figure 2:
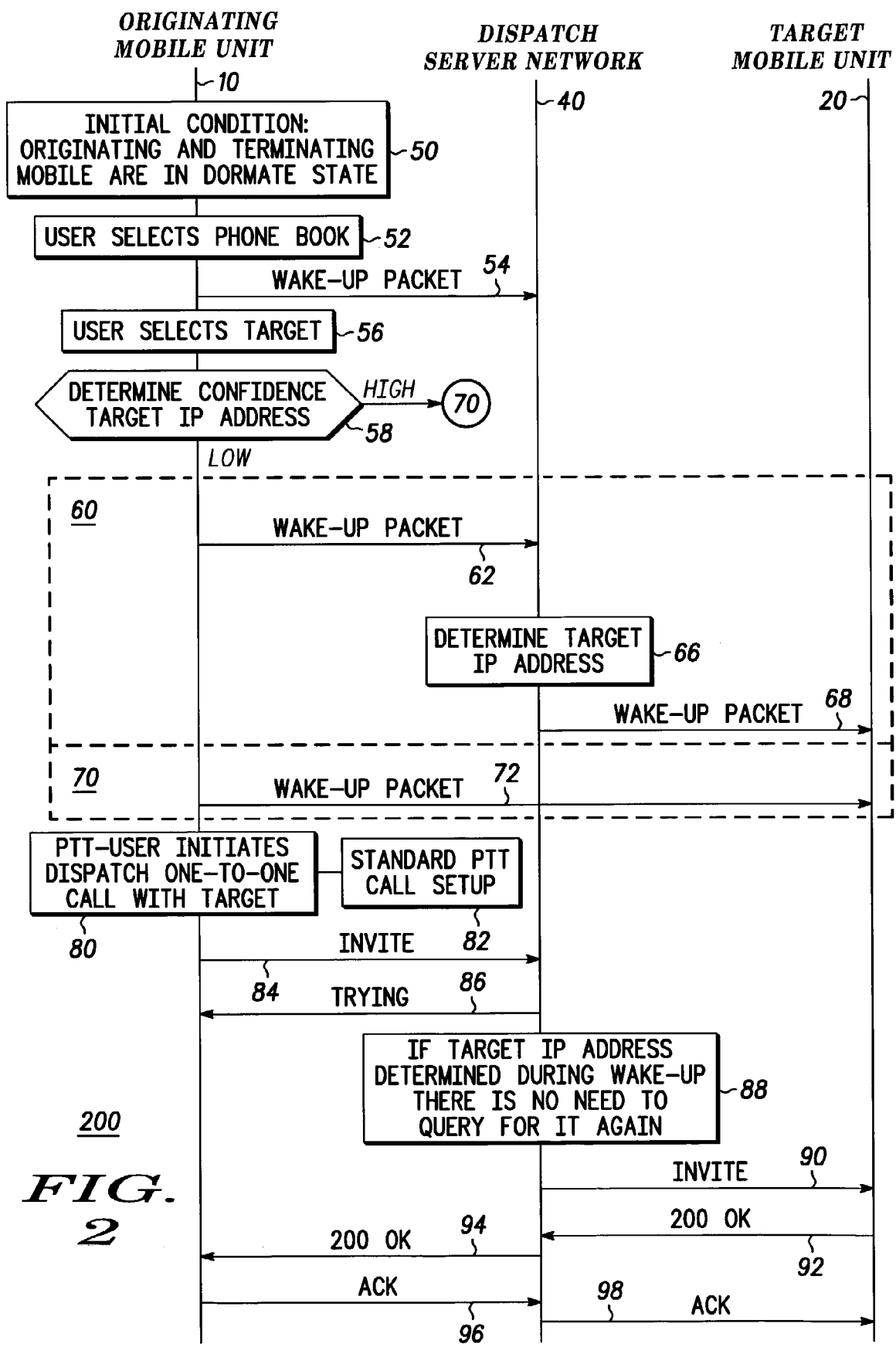
FIG. 2 is a call flow diagram of a private call in accordance with the present invention.

Referring to FIG. 2, a call flow diagram of a private call using proactive action or speculation by the originating mobile unit 10 is shown. Block 50 indicates that the initial conditions are that the originating mobile unit 10 and the terminating or target mobile unit 20 are in the dormant state. Next, originating mobile unit 10 selects the phone book function of the mobile unit 10, block 52. Selecting a phone activation function may include any activity such as: selecting by the originating mobile unit 10 a phone book function; selecting by the originating mobile unit a push-to-talk function from a menu; opening up a mobile phone cover; or removing a mobile phone from its holster, for example. Immediately after this selection, mobile unit 10 sends a wake-up packet 54 to the dispatch server network 40. This establishes an RF link between originating mobile unit 10 and network 40 prior to any actual call origination to a target. This technique to speculatively put the originator on the RF channel may be used independently of any later techniques to wake-up the target mobiles.

The user (not shown) of originating mobile unit 10 then selects the terminating or target mobile unit 20. This selection may be accomplished by manipulating of the cursor in the phone book or by voice if such feature is available.

Next, either the steps and procedures of block 60 or block 70 are performed. The determination of whether to perform the method of block 60 or block 70 is based upon the confidence of the originating mobile unit in the current IP address it has stored (cached) from prior use and the age of the IP address. For example, if an IP address is minutes old, there is a high probability it is still a usable address to reach the target mobile unit. However, if the IP address of the target mobile unit is hours or days old, there is a very high probability that it is no longer a useful IP address to reach to target or terminating mobile unit.

It should be noted that on these diagrams, directly routing to an IP address still requires the wake-up packets to be routed through a radio access network before they are delivered to the mobile. Block 70 allows the packets to bypass the dispatch server, as the dispatch server does not need to provide any internet forwarding functions (i.e., Domain Name System-DNS lookups).

If the user takes a long time to actually select the target users, it is possible that dispatch server network 40 could revert the mobile from active back to dormant state, with the network assuming that there is no more activity planned for the mobile, so that RF resources are released. Therefore, if the mobile application determines that the user is still in the process of selecting users, the wake-up packet 54 may require to be periodically be repeated.

In a preferred embodiment, if the target IP address is old, block 60 is performed. The oldness of an IP address is dependant upon parameters of the packet data network and movement of the mobile units. When the target mobile unit 20 is selected by originating mobile unit 10, a wake-up packet is sent 62 from mobile unit 10 to the dispatch server network 40.

Next, the dispatch server network 40 determines the target mobile unit 20 IP address, block 66. This can be done through well known DNS procedures, or other IP based methods. Finally, the processing of block 60 then forwards the wake-up packet 68 to the target mobile unit 20, causing the target mobile 20 to be moved from the dormant to active state. Now, before any call processing signaling is sent between mobile 10, network 40, or mobile 20, both mobiles are in the active state on an RF resource. This condition will now allow for signaling to be very rapidly exchanged between mobiles 10 and 20, as the delays associated with moving from dormant to active states are removed from the signaling timeline.

In a preferred embodiment, if the IP address of the target mobile unit 20 is less than an hour old, there is a high probability that it is a valid IP address. Accordingly, block 70 will be performed. Mobile unit 10 sends a wake-up packet 72 directly to target mobile unit 20, traversing through any required access networks, but bypassing the dispatch server. Either the methodology of block 60 or block 70 will have been performed. Next, for both methodologies, the user of originating mobile unit 10 pushes the push-to-talk button and initiates a dispatch one-to-one call with the target mobile unit 20, block 80. This push-to-talk initiation is a standard call setup, block 82.

In a preferred embodiment, the Session Initiation Protocol (SIP) is used to convey the required signaling to establish the call. The originating mobile unit 10 next sends a SIP invite message 84 to the dispatch server network 40 for the target mobile unit 20. Dispatch server 40 replies with a trying message 86 to the originating mobile unit 10. If the target's mobile unit 20 IP address was previously determined as valid during the wake-up message, there is no need to again determine the target mobile unit 20 IP address, block 88. In any event, the SIP invite message 90 is transmitted to the target mobile unit 20. Then target mobile unit 20 responds with a 200 ok message to the dispatch server network 40. Dispatch server network 40 forwards the 200 OK message to originating mobile unit 10. Originating mobile unit then transmits an acknowledge message 96 to the network 40. Network 40 forwards this acknowledge message 98 to target mobile unit 20. Then the process for one-to-one call initiation has been completed.

Table 1 depicts the times for each of the functions of a call setup and the total call setup time for a one-to-one call as has been previously described. It is to be noted that the call setup time, and the best case scenario, may be reduced from 9.3 seconds to 2.3 seconds. This is a dramatic saving of 7 seconds. This setup savings is easily noticeable by the users. As noted, the originator speculation could be used separately from the target speculation; the target speculation is not a required step to get the benefits of the originator speculation improvements.

TABLE 1

One-to-One Call Example on CDMA 1X Technologies

|  | No Speculation | Estimate with Speculation | Likely Performance with Speculation |
|---|---|---|---|
| Originator Dormant to Active | 3.2 | 1.7 | 0.0 |
| Over the air message Xmit Delay, inc PDSN | 2.1 | 2.1 | 2.1 |
| PTT Server | 0.2 | 0.2 | 0.2 |
| Target Dormant to Active | 3.8 | 3.0 | 0.0 |
| TOTAL Call Setup Time | 9.3 | 7.0 | 2.3 |

Referring to FIG. 3, a call flow chart of a selective dynamic group call using proactive speculation methodology is shown. A group call is a one to many user call function. Selective dynamic refers to the ability of the originating user to select multiple target users on his/her mobile device, and to dynamically enter a group call, as opposed to a statically pre-defined group defined in the network. Originating mobile unit 10 is attempting to establish a push-to-talk call with mobile units 20 and 30. There may of course be many mobile units targeted for the push-to-talk call. For the sake of simplicity only two target mobiles will be discussed.

The initial condition is that the originating mobile unit 10 and the terminating or target mobile units 20–30 are in the dormant state, block 110. Next, the user (not shown) of originating mobile unit 10 selects the selective dynamic group call function (or as noted previously, selects his/her phone book function), block 112. Selecting a phone activation function or the selective dynamic group call function may include any activity such as: selecting by the originating mobile unit 10 a phone book function; selecting by the originating mobile unit a push-to-talk function from a menu; opening up a mobile phone cover; or removing a mobile phone from its holster, for example. This indicates that mobile unit 10 is placing a push-to-talk call to several target mobile units, 20–30.

Then a wake-up packet is sent 114 from originating mobile unit 10 to the dispatch server network 40, that causes the originating mobile unit 10 to move from dormant to active state. This serves to establish an RF link between the originating mobile unit 10 and the network 40.

For group calls there are a number of methods for selecting the target users. One method is to pre-provision the identity of each of the target mobile units 20–30. This means that a list of the IP addresses of each of the target mobile units is kept within the originating mobile unit 10 and may simply be selected by one selection instead of individually.

Another method of selecting the individuals or targets is to selectively, dynamically form a group call. That is an originating user may dynamically select the target members of a group call from a list or menu of potential users. Two optional methods are shown for providing the selective, dynamic group call function. These methods are indicated by blocks 120 and 140 respectively. That is, either the method of block 120 is performed or the method of block 140 is performed.

The methodology of block 120 is a single one-at-a-time selection process. When originating mobile unit 10 selects the first target mobile unit 20 block 120, mobile unit 10 sends a wake-up packet 122 to the dispatch sever network 40. Network Server. 40 then transmits the wake-up packet 124 to mobile unit 20, establishing an RF link, transitioning the mobile unit 20 from dormant to active state, between the network 40 and target mobile unit 20. This is done in anticipation of future signaling being delivered. As with the scenario for the one-to-one call as shown in FIG. 2, originating mobile unit 10, if it has stored a current IP address for target mobile unit 20 may send the wake-up packet directly to target mobile unit 20. Next, the user of originating mobile unit 10 selects the group called target mobile unit 30, block 126. When originating mobile unit 10 selects target mobile unit 30, originating mobile unit 10 sends a wake-up packet 28 to dispatch sever network 40. Network 40 subsequently determines the IP address of target mobile unit 30 and sends the wake-up packet 130 to target mobile unit 30, thereby establishing an RF link, which transitions the mobile unit 30 from dormant to active, between the network and target mobile unit 30. Again, as previously mentioned, if originating mobile unit 10 has a current IP address for target mobile unit 30, it may directly send the wake-up packet to mobile unit 30.

The selection process may be iterated for as many target mobile units as are to be included in the selective dynamic group call. The user will spend time selecting users in the address book of the mobile unit 10, which is exploited by this technique by waking up potential targets of a call in anticipation of a call. When all target mobile units have been selected and the wake-up packets transmitted, originating mobile unit 10 sends an invite request message to the selective dynamic call group 132 to network 40. Thereby the push-to-talk function has been enabled. Network 40 responds with a 200 OK group call ID message 134 to mobile unit 10.

In an alternate embodiment of the invention depicted in block 140, the methodology depicts a selective dynamic group call in which each of the target mobile units is directly awakened with a wake-up message by the originating mobile unit 10. If the originating mobile unit 10 has valid IP addresses for the target mobile units, the originating mobile unit 10 selects the group call targets and directly the wake-up calls to the targets, blocks 146–148.

Then, originating mobile unit 10 initiates the push-to-talk function for the group call, block 152. This generates an Invite group message 154 that is sent to network 40. Network 40 returns a trying message 156 to mobile unit 10.

Network 40 then sends the SIP invite request messages 160–162 to the target mobile units 20–30. If the IP addresses for the target mobile units were determined during the wake-up packet transmissions 146–148, then there is no need to perform the determination for these IP addresses a second time, block 158. This is due to the fact that since the timing between wake-up and the SIP invite messages is very short, a matter of seconds.

Each of the target mobile units 20–30 then responds with a 200 ok message 164–166 to network 40. Network 40 then responds to the originating mobile unit 10 with a 200 ok message, 168. An acknowledge message 170 is then transmitted from originating mobile unit 10 to network 40 and subsequently acknowledge messages are transmitted from network 40 to target mobile units 20–30, flows 172–174. The selective dynamic group call may then occur and the call setup process is ended.

As with the case for the one-to-one call mentioned above, a great deal of time is saved in the call setup process. The time saved roughly equates to the amount of time saved in the process of getting the originator and target mobiles from dormant to active states prior to the need of sending the call setup signaling, exploiting the human time required to access the phone book, selecting users, and then actually engaging the PTT function. A sample savings of the time required for call setup for the selective dynamic group call case is shown below in Table 2.

TABLE 2

Selective Dynamic Group Call Example on CDMA 1X

|  | No Speculation | Likely Performance with Speculation |
| --- | --- | --- |
| Originator Dormant to Active | 3.2 | 0.0 |
| Over the air message Xmit Delay, inc PDSN | 2.3 | 2.3 |

TABLE 2-continued

Selective Dynamic Group Call
Example on CDMA 1X

|  | No Speculation | Likely Performance with Speculation |
|---|---|---|
| PTT Server | 0.4 | 0.4 |
| Target Dormant to Active | 3.8 | 0.0 |
| TOTAL Call Setup Time | 9.7 | 2.7 |

It is to be noted that as with the case of the one-to-one calls, for the selective dynamic group call, up to 7 seconds of setup time may be saved in this example. These savings of call setup time reflect use of the subject invention in a CDMA 1X type network.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A push-to-talk call setup method for a one-to-one call in a packet data network comprising the steps of:
   selecting by an originating mobile unit a phone activation function;
   transmitting by the originating mobile unit a wake-up packet for the originating mobile unit to the packet data network;
   selecting, after the transmitting step, by the originating mobile unit a target mobile unit; and
   activating a push-to-talk function by the originating mobile unit.

2. A push-to-talk call setup method as claimed in claim 1, wherein there is further included a step of determining by the originating mobile unit whether a stored internet protocol (IP) address for the target mobile unit is valid.

3. A push-to-talk call setup method as claimed in claim 2, wherein if the stored IP address is not valid, there is further included a step of sending a wake-up packet to the packet data network for the target mobile unit.

4. A push-to-talk call setup method as claimed in claim 3, wherein there is further included a step of determining by the packet data network a valid IP address for the target mobile unit.

5. A push-to-talk call setup method as claimed in claim 4, wherein there is farther included a step of sending by the packet data network a wake-up packet to the target mobile unit.

6. A, a push-to-talk call setup method as claimed in claim 5, wherein there is further included a steps of:
   activating by the originating mobile unit a push-to-talk function with the target mobile unit; and
   sending a signaling message by the originating mobile unit to the target mobile unit.

7. A push-to-talk call setup method as claimed in claim 2, wherein if the stored IP address is valid, there is further included a step of sending a wake-up packet directly to the target mobile unit.

8. A push-to-talk call setup method as claimed in claim 7, wherein there is farther included steps of:
   activating by the originating mobile unit a push-to-talk function with the target mobile unit; and
   sending a signaling message by the originating mobile unit to the target mobile unit.

9. A push-to-talk call setup method as claimed in claim 1, wherein the step of selecting by an originating mobile unit a phone activation function includes at least one of the steps of:
   selecting by the originating mobile unit a phone book function;
   selecting by the originating mobile unit a push-to-talk function from a menu;
   opening up by the originating mobile unit a phone cover; and
   removing by the originating mobile unit from its holster.

10. A group call setup method in a packet data network comprising the steps of:
    selecting by an originating mobile unit a phone activation function;
    transmitting by the originating mobile unit a wake-up packet for the originating mobile unit to the packet data network;
    selecting one of a plurality of target mobile units, after the step of transmitting, by the originating mobile unit;
    transmitting, by the originating mobile unit, a wake-up packet for the one of the plurality of target mobile units; and
    iterating the steps of selecting one and transmitting the wake-up packet for each of the plurality of target mobile units.

11. A group call setup method as claimed in claim 10 wherein there is further included a step of activating a push-to-talk function by the originating mobile unit.

12. A group call setup method as claimed in claim 11, wherein after transmitting the wake-up packet for each of the plurality of target mobile units, there is further included a step of sending by the originating mobile unit a group call invite request for each of the plurality of target mobile units.

13. A group call setup method as claimed in claim 10, wherein there is further included a step of sending by the packet data network a session initiation protocol request to each of the plurality of target mobile units.

14. A push-to-talk call setup method as claimed in claim 10, wherein the step of selecting by an originating mobile unit a phone activation function includes at least one of the steps of:
    selecting by the originating mobile unit a phone book function;
    selecting by the originating mobile unit a push-to-talk function from a menu;
    opening up by the originating mobile unit a phone cover; and
    removing by the originating mobile unit from its holster.

15. A group call setup method in a packet data network comprising the steps of:
    selecting by an originating mobile unit a phone activation function;
    transmitting by the originating mobile unit a wake-up packet for the originating mobile unit to the packet data network;
    selecting one of a plurality of target mobile units, after the step of transmitting, by the originating mobile unit;

transmitting, by the originating mobile unit, a wake-up packet directly to one of the plurality of target mobile units; and iterating the steps of selecting one and transmitting the wake-up packet directly for each of the plurality of target mobile units.

16. A group call setup method as claimed in claim 15, wherein the step of transmitting a wake-up packet directly to one of the plurality of target mobile units is performed if the originating mobile unit has a valid IP address for the one of the plurality of mobile units.

17. A group call setup method as claimed in claim 15 wherein there is further included a step of activating a push-to-talk function by the originating mobile unit.

18. A group call setup method as claimed in claim 15, wherein after transmitting the wake-up packet directly to each of the plurality of target mobile units, there is further included a step of sending by the originating mobile unit a group call invite request for each of the plurality of target mobile units.

19. A push-to-talk call setup method as claimed in claim 15, wherein the step of selecting by an originating mobile unit a phone activation function includes at least one of the steps of:

selecting by the originating mobile unit a phone book function;

selecting by the originating mobile unit a push-to-talk function from a menu;

opening up by the originating mobile unit a phone cover; and removing by the originating mobile unit from its holster.

* * * * *

UNITED STATES PATENT AND TRADEMARK OFFICE
CERTIFICATE OF CORRECTION

| | |
|---|---|
| PATENT NO. | : 7,231,223 B2 |
| APPLICATION NO. | : 10/323428 |
| DATED | : June 12, 2007 |
| INVENTOR(S) | : May et al. |

Page 1 of 1

It is certified that error appears in the above-identified patent and that said Letters Patent is hereby corrected as shown below:

Claim 5, Col. 7, line 51; please change "farther" to --further--

Claim 8, Col. 8, line 65; please change "farther" to --further--

Signed and Sealed this

Twentieth Day of May, 2008

JON W. DUDAS
*Director of the United States Patent and Trademark Office*